July 5, 1960

R. HUBER 2,943,438

IMPROVEMENTS IN FREE PISTON ENGINE
AND GAS TURBINE POWER PLANT

Filed Jan. 21, 1955

INVENTOR
Robert Huber
BY
Bailey, Stephens and Huettig
ATTORNEYS

INVENTOR
Robert Huber
BY
Bailey, Stephens and Huettig
ATTORNEYS

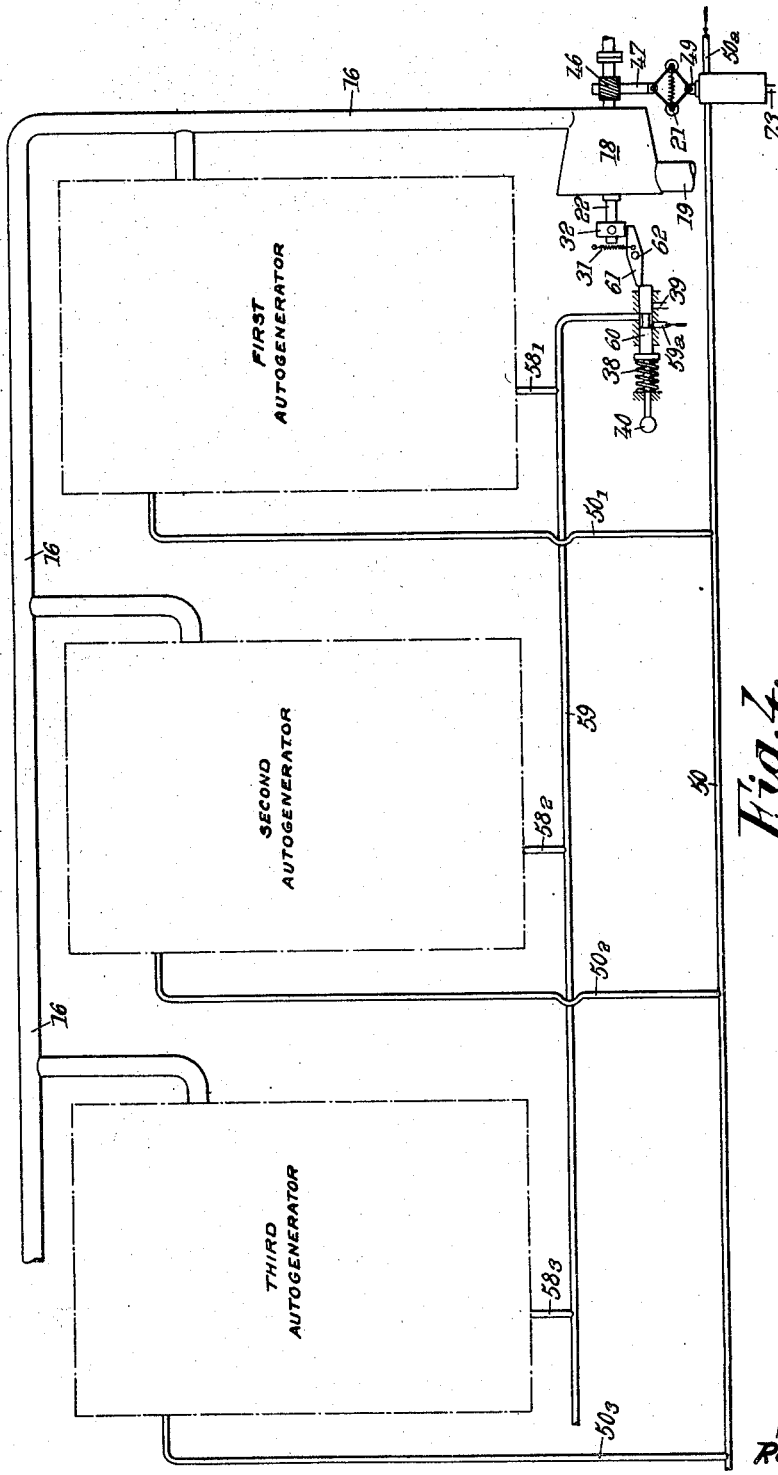

United States Patent Office 2,943,438
Patented July 5, 1960

2,943,438

IMPROVEMENTS IN FREE PISTON ENGINE AND GAS TURBINE POWER PLANT

Robert Huber, Bellevue, France, assignor to Societe d'Etudes et de Participations, Eau, Gaz, Electricite, Energie, S.A., Geneva, Switzerland, a society of Switzerland Filed Jan. 21, 1955, Ser. No. 483,376

Claims priority, application France July 5, 1950

2 Claims. (Cl. 60—13)

The present invention relates to power plants including at least one free piston machine supplying a stream of fluid under pressure and one receiver machine driven by this stream of fluid.

The expression "free piston machine supplying a stream of fluid under pressure" includes the three kinds of machines known as "motor compressors," "auto-generators" and "motor-pumps," i.e, free piston machines constituted by the combination of a power portion of the internal combustion type and a compressor portion. However, my invention is more especially concerned with free piston auto-generators, that is to say machines in which the air compressed in the compressor portion of the machine serves either wholly or at least mostly to feed and to scavenge the power cylinder of this machine, where the combustion gases are but partly expanded. The exhaust ports of the power cylinder thus deliver a mixture of hot gases under pressure constituted by these combustion gases and the excess of feed and scavenging air.

Furthermore, the expression "free piston" applies not only to pistons both of the dead centres of which may undergo variations but also to pistons which are sometimes called "semi-free pistons" having only one free dead centre position, the other dead centre position being fixed by means of a kinematic device.

As for the receiver machine driven by the fluid under pressure delivered by the free piston machine, it may work either with a rotary or with a reciprocating motion. However, the invention is more especially concerned with the case where the receiver machine is a gas turbine.

The chief object of my invention is to provide a plant of this kind which is better adapted to meet the requirements of practice than those used for the same purpose up to the present time.

For this purpose, according to my invention, normally inoperative governor means operative by said receiver machine are made responsive to a rise of the speed of operation of said receiver machine above a predetermined limit value for stopping the supply of power fluid from said free piston machine to said receiver machine as soon as such limit speed is reached, exclusively by making inoperative the means for feeding fuel to the power portion of the free piston machine.

According to another feature of my invention, I further provide means operative by the pistons of the free piston machine so as to make said fuel feed means inoperative when the amplitude of the movements of the pistons of said free piston machine exceeds a given value.

Preferred embodiments of my invention will be hereinafter described with reference to the accompanying drawings, given merely by way of example and in which.

Figure 1:
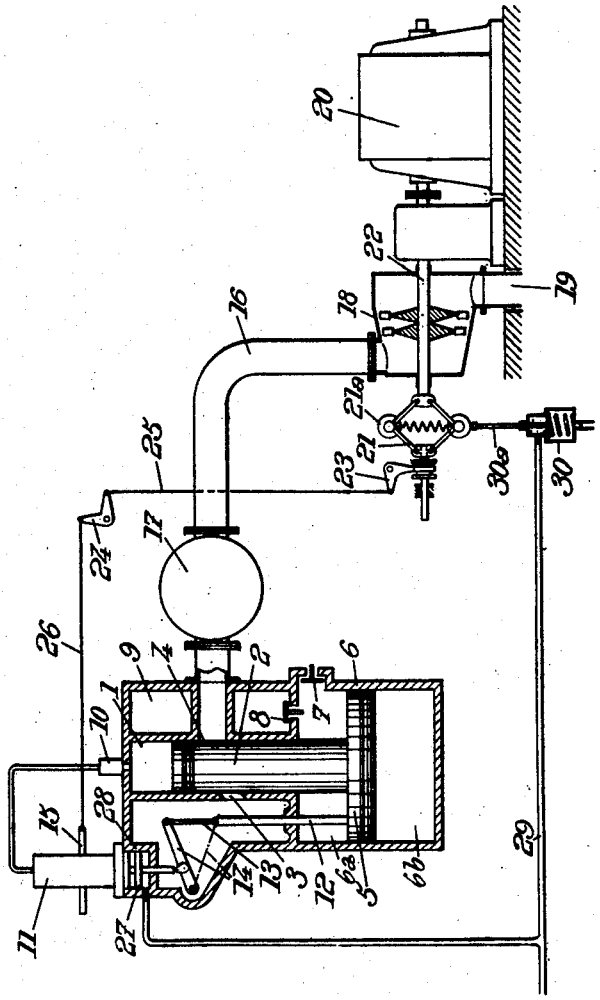
Fig. 1 shows a plant according to my invention including a free piston auto-generator and a gas turbine driven by the gases supplied by this auto-generator.

Fig. 4 diagrammatically shows a plant according to the invention including a plurality of free piston auto-generators.

The free piston auto-generator includes, as usual, a power cylinder 1 cooperating with a power piston 2, preferably working with the two stroke Diesel cycle, this piston controlling the inlet ports 3 and exhaust ports 4 of said power cylinder 1.

This power piston is rigid with a compressor piston 5 cooperating with a compressor cylinder 6. One of the chambers of this last mentioned cylinder, for instance 6a, constitutes the compressor element proper and is provided with inlet valve means 7 and delivery valve means 8. The other chamber 6b of cylinder 6 acts as a return energy accumulator and stores up the energy developed in the power cylinder during the outward stroke to give it back to the piston unit, thus producing the inward stroke thereof, during which the air admitted into the compressor chamber is compressed and discharged into the casing 9 of the auto-generator, whereas the combustion air imprisoned in the power cylinder after ports 3 and 4 have been closed is being compressed.

At the end of this inward stroke of the piston unit, fuel is injected into the highly compressed air present in the power cylinder, by means of an injector 10 supplied from a fuel pump 11. Pump 11 is driven by the piston unit, through a rod 12 rigid with the compressor piston 5, a connecting rod 13 and a lever 14. Adjustment of the amount of fuel injected per cycle is obtained through an adjusting rod 15 which, for instance, rotates the piston of injection pump 11 about its axis, as it will be hereinafter explained.

The power gases, which consist of a mixture of the partly expanded combustion gases and of the portion of the air compressed in the compressor cylinder which has flown throughout the power cylinder, are conveyed through a conduit 16 (where may include a reservoir 17 as shown by Fig. 1) to the inlet of a gas turbine 18. This turbine is thus driven by said gases which, after expanding and cooling down therein, escape through outlet conduit 19. Turbine 18 may be used to drive any suitable device, for instance a dynamo 20 (Fig. 1).

For the sake of simplicity, I have shown an auto-generator having a single piston 2–5 working in cylinder 1–6, but generally, auto-generators include two such pistons working in opposed directions in opposed cylinders respectively.

In the construction of Fig. 1, the adjusting rod 15 of injection pump 11 is controlled by a speed governor 21 mounted on the shaft 22 of turbine 18. A link system including bell crank levers 23 and 24 and rods 25 and 26 transmits the control displacements of governor 21 to said adjustment rod 15.

When, for any reason, the speed of turbine 18 exceeds the maximum value admissible for normal operation of the plant, the plant is to be stopped immediately. For this purpose, according to my invention, the auto-generator is stopped exclusively by cutting off the feed of fuel to the power portion thereof in response to an increase of the speed of turbine shaft 22 above a given value. This stopping is practically instantaneous and the plant, when the auto-generator is stopped, is emptied of gas under pressure within a very short time, say some tenths of a second. Any racing of turbine 18 is thus made impossible.

In order to cut off the feed of fuel to the auto-generator power portion, I preferably stop injection pump 11. I may, for instance, stop the drive of the piston thereof by rod 12. I might also open an orifice for discharging to the outside the fuel delivered by this piston before this fuel has reached cylinder 1. In the construction of Fig. 1 which will now be specifically described, the piston rod of pump 11 is fitted with an auxiliary piston 27 cooperating with a cylinder 28. The lower chamber of this cylinder can be connected through a conduit 29 with a source of air under pressure not shown by the drawing. This conduit 29 is normally out of communication with said source owing to the provision of a valve 30 held in its closed position by the combined actions of the pressure from said source and of a spring. When this valve 30 is opened, air under pressure is fed from said source to move piston 27 upwardly in cylinder 28 and to raise the main piston of pump 11 so that the reciprocating motion of this piston is stopped and fuel is no longer supplied to the auto-generator.

Valve 30 is opened by a speed governor mounted on the turbine shaft 22, for instance by governor 21 when the speed of the turbine exceeds said admissible value. The masses 21a of governor 21 are then moved to a distance from the axis of rotation of said governor such that they act upon the rod 30a of valve 30 and cause this valve to open.

It should be noted that for all power plants where a receiver machine is fed with power fluid from a free piston machine, it is possible to prevent racing of the receiver machine by stopping the free piston machine, because one of the features of a free piston machine is that it can be stopped immediately so as to achieve a sudden stopping of the feed of power fluid.

In the embodiment of my invention described with reference to Fig. 1, the free piston machine is stopped only in response to an increase of the speed of rotation of the turbine above a predetermined value.

According to my invention, I may combine with such a device means for stopping the free piston machine when the amplitude of the strokes of the pistons thereof exceeds a predetermined value. Such a system is illustrated by Figs. 2 and 3.

In this case, the fuel pump is stopped in a slightly different fashion. The wall of the cylinder 11 of said pump is provided with a discharge orifice 51 so that the fuel driven by piston 43 cannot flow past the discharge valve 44 of the pump when said orifice 51 is open.

Figure 2:
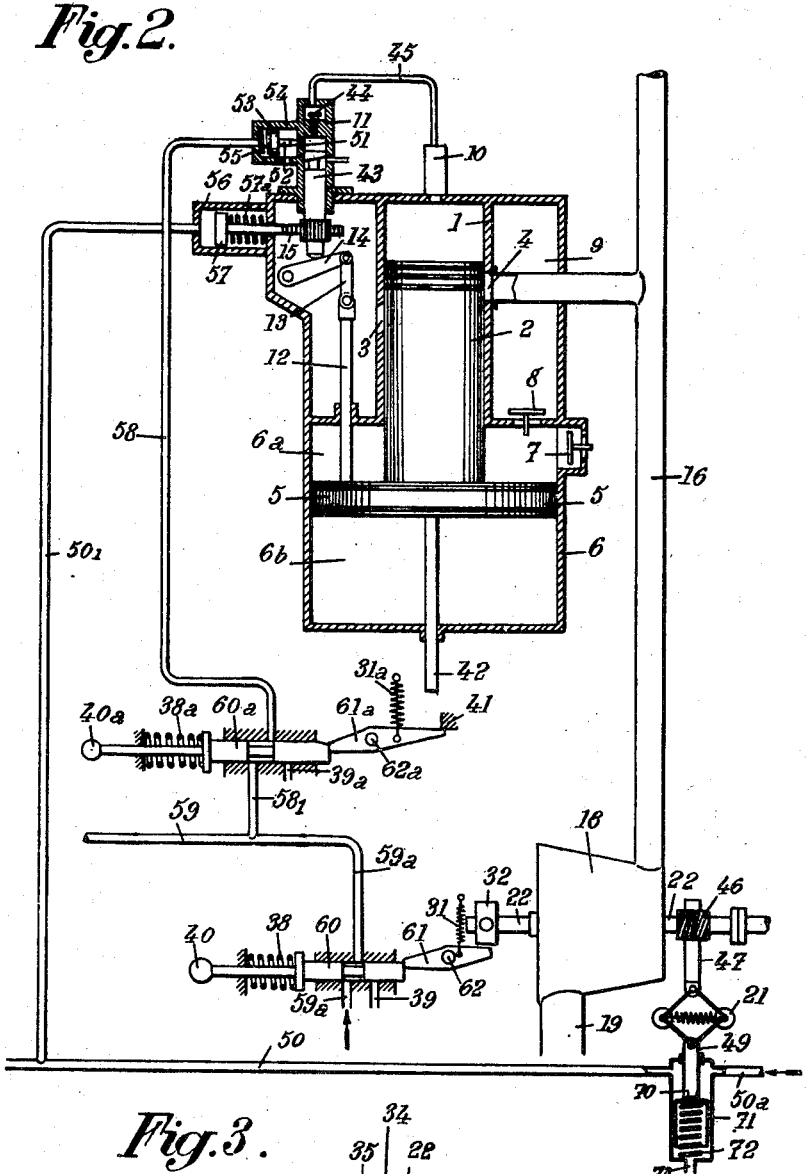
Fig. 2 is a view similar to Fig. 1 but showing another embodiment of my invention.
Figure 3:
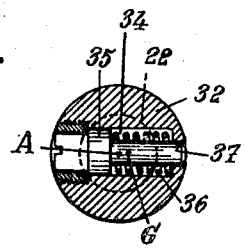
Fig. 3 is a sectional view showing a detail of the system of Fig. 2.

As long as the plant is working normally, the means for stopping fuel injection to the auto-generators (it is supposed that the system includes a plurality of auto-generators similar to that shown on Fig. 2, said plurality of auto-generators being shown in Fig. 4) remain inoperative, that is to say the orifices 51 are closed by needle valve 52. Each needle valve 52 is carried by a piston 53 movable in a cylinder 54 where it is subjected to the action of a spring 55 which constantly urges needle valve 52 against orifice 51 so as to close it. Furthermore, cylinder 54 is fed with a fluid under pressure from conduit $58_1$ which acts on piston 53 in the same direction as the spring 55. In the example illustrated by the drawing, this fluid is a liquid fed through conduit $58_1$, said conduit $58_1$ branching off from a conduit 59 one end 59a of which is common to all the auto-generators of the plant. Said end of the conduit 59 is connected with a source of liquid under pressure not shown on the drawing.

The hydraulic control system for stopping the operation of fuel pump 11 includes two valves mounted in series in each of the conduits which serve to feed fluid under pressure from a source to cylinder 54. The first of these valves stops the feed of the liquid to said cylinder and connects it with a discharge orifice when the speed of turbine 18 exceeds a predetermined value. The other valve acts in the same fashion upon the pump control cylinder 54 when the length of stroke of the free piston of the auto-generator exceeds a predetermined maximum value.

When the plant includes a plurality of auto-generators serving to feed power gases to the same turbine such as 18, a single valve may be used for stopping all the auto-generators of the plant when the speed of the turbine exceeds its maximum limit value. This single valve is then interposed in the portion 59a of conduit 59 which is common to all of the conduits $58_1$, $58_2$, $58_3$, that is to say from which all of said conduits $58_1$, $58_2$, $58_3$ branch off. On the contrary, the valves which are to stop each of the auto-generators when the free piston or pistons thereof move beyond the predetermined position are inserted in conduits $58_1$, $58_2$, $58_3$.

The valve operating in response to variations of the speed of turbine 18 includes a slide valve 60 which, in the position shown by Fig. 2, permits fluid to flow through conduits $58_1$, $58_2$, $58_3$. This slide valve 60 is held in this position by an abutment element constituted by a lever 61 rotatable about an axis 62 and urged by a spring 31 toward its locking position for which one of the ends of said lever 61 is applied against the front end face of slide valve 60, whereas the other end of said lever 61 is applied against the normally circular edge of a disc 32 rigid with the shaft 22 of turbine 18. This disc 32 is provided with a housing 34 (see Fig. 3) in which is slidable a mass 35 the centre of gravity G of which is eccentric with respect to the axis of rotation A of shaft 22. This mass includes a rod surrounded by a spring 36 and a head located, with respect to the centre of gravity G, on the same side as said axis A, spring 36 being interposed between said head of mass 35 and the end of housing 34. Said end of housing 34 is provided with an orifice 37 through which the rod of mass 35 can pass freely.

Spring 36 is tensioned initially so that its effect opposes the action of the centrifugal force which tends to move the rod of mass 35 to the outside of orifice 37. Said spring thus retains mass 35 inside disc 32 as long as the speed of rotation of turbine 18 is below the maximum speed which must not be exceeded by said turbine. If this speed is exceeded, the rod of mass 35 projects from orifice 37 and causes lever 61 to swing so that this lever ceases to stop slide valve 60. A spring 38, acting upon said slide valve, urges the latter toward the right hand side, whereby the communication between conduit 59a and the source of liquid under pressure is stopped whereas conduit 59a is connected to a discharge conduit 39. Consequently the fluid under pressure ceases to act upon needle valves 52 for all the auto-generators, thus cutting off the feed of fuel to said machines which are immediately out of action.

When the speed of turbine 18 has dropped back below its limit value, it is possible to return slide valve 60 into its initial position for which it permits fluid under pressure from the source to pass into cylinder 54. This return of slide valve 60 into its initial position may be effected by pulling handle 40 against the action of spring 38.

Concerning now the control valves interposed in the individual conduits $58_1$, $58_2$, $58_3$ so as to stop the operation of each of the auto-generators when the length of stroke of the pistons thereof exceeds a predetermined value, they are advantageously constituted in the same manner as those above described for operation in response to variations of the speed of turbine 18.

The parts of said valve means which have the same function as those above described are designated by the same reference numerals with index a. However, lever 61a is applied by a spring 31a against a fixed abutment 41. When the piston 3–4 of the corresponding auto-generator exceeds its maximum stroke, a rod 42 fixed to this piston and passing through the end of cylinder 2 strikes lever 61a and causes it to swing in the clockwise direction, whereby slide valve 60a is pushed by spring 38a into a position where it cuts off conduit $58_1$ from the source of fluid under pressure and connects it with a discharge conduit 39a. The injection of fuel to this auto-generator is immediately stopped. The other auto-generators of the plant keep working. Slide valve 60a can be returned into its initial position by means of handle 40a.

With the system described with reference to Figs. 2 and 3, immediate stopping of all the auto-generators of the plant is obtained as soon as turbine 18 runs beyond its maximum admissible value, and each of the auto-generators is individually stopped when the piston or pistons thereof has a length of stroke beyond the maximum admissible value.

In the construction of Fig. 2, regulation of injection pump 11 in response to variation of the speed of turbine shaft 22 is obtained as follows.

Adjustment rod 15 constitutes a rack meshing with a pinion rigid with the pump piston. Said rod is carried by a piston 57 slidable in a cylinder 56. Piston 57 is movable under the effect of the pressure of a fluid transmitted to cylinder 56 through a conduit $50_1$, against the action of a return spring 57a. The fluid under pressure is fed to conduit $50_1$ from a main conduit 50. The source of fluid under pressure is connected with a portion 50a of conduit 50. Between conduit sections 50a and 50 is inserted a control device operated by governor 21 driven from shaft 22 through gear 46.

Said fluid flow control device includes a cylindrical chamber in communication with both of conduit sections 50 and 50a. A piston 71 slidable in said chamber is urged upwardly by a spring 72. On the lower side of said piston 71, the cylindrical chamber is in communication with a discharge passage 73. The end face of piston 71 is provided with a hole 70 against which is applied the end face of a rod 49 actuated by governor 21. The fluid leak through hole 70 is the greater as the pressure with which rod 49 is applied against the top face of piston 71 is lower and this pressure is itself the lower as governor is being driven at higher speed by shaft 22.

This invention is a continuation-in-part of my application Ser. No. 233,462, filed June 25, 1951, now abandoned.

In a general manner, while I have, in the above description, disclosed what I deem to be practical and efficient embodiments of my invention, it should be well understood that I do not wish to be limited thereto as there migh be changes made in the arrangement, disposition and form of the parts without departing from the principle of the present invention as comprehended within the scope of the accompanying claims.

What I claim is:

1. A power plant which comprises, in combination, a free piston machine for supplying a stream of fluid under pressure, said machine including a power portion of the internal combustion engine type having an air intake and an exhaust output and a compressor portion operated by said power portion and arranged to supply compressed air to take air intake, a fuel pump for feeding fuel to said power portion, fluid operated means for controlling said fuel pump, said fluid operated means including a fluid conduit interposed between said pump and a source of fluid under pressure and two valves mounted in series with each other in said conduit so that shifting of either of said valves from a normal position thereof to an emergency position thereof makes said fuel pump inoperative, a turbine having its input connected with said exhaust output of said free piston machine power portion, governor means mounted on the shaft of said turbine and connected with one of said valves, said governor means being responsive to a rise of the speed of operation of said turbine above a predetermined limit value for stopping the supply of said fluid from said free piston machine to said turbine as soon as such limit speed is reached exclusively by moving said last mentioned valve from the normal position thereof to the emergency position thereof, and means responsive to variations of the length of stroke of the piston of said free piston machine for shifting the other of said valves from the normal position thereof to the emergency position thereof in response to an increase of said length of stroke beyond a predetermined limit value.

2. A power plant which comprises, in combination, a plurality of free piston machines for supplying a stream of fluid under pressure, each of said machines including a power portion of the internal combustion engine type having an air intake and an exhaust output and a compressor portion operated by said power portion and arranged to supply compressed air to said air intake, means for feeding fuel to said power portion, a receiver machine having its input connected with said exhaust outputs of said power portions of said free piston machines, governor means operative by said receiver machine and responsive to a rise of the speed of operation of said receiver machine above a predetermined limit value for making all of said fuel feed means inoperative as soon as such limit speed is reached, and means operatively connected with each of said free piston machines and responsive to variations of the length of stroke of one piston thereof for making said fuel feed means thereof inoperative when the length of stroke of said piston thereof exceeds a predetermined value.

References Cited in the file of this patent

UNITED STATES PATENTS

| | | |
|---|---|---|
| 2,147,935 | Steiner | Feb. 21, 1939 |
| 2,472,924 | Schwendner | June 14, 1949 |
| 2,551,429 | Eppens | May 1, 1951 |
| 2,599,480 | Pfenninger | June 3, 1952 |
| 2,645,474 | Barnes | July 14, 1953 |
| 2,779,156 | Huber | Jan. 29, 1957 |

FOREIGN PATENTS

| | | |
|---|---|---|
| 595,117 | Great Britain | Nov. 27, 1947 |